United States Patent Office 2,991,184
Patented July 4, 1961

2,991,184
CONTROL OF SOURING IN FLEXO-GRAPHIC INKS
Dominic J. Bernardi, Scarsdale, N.Y., and William B. Westcott, River Edge, N.J., assignors to Interchemical Corporation, New York, N.Y., a corporation of Ohio
No Drawing. Filed Aug. 18, 1958, Ser. No. 755,402
5 Claims. (Cl. 106—30)

This invention relates to improvements in flexographic printing and in inks therefor. Flexographic printing is a letter-press process and is characterized by the fact that the ink is applied to the work by rotary rubber plates. Due to the great flexibility of this process, its low operating costs, and the extremely high press speeds, possible even when printing on troublesome stocks, it is widely used for printing on packaging materials such as cellophane, glassine, polyethylene films, metal foils, kraft paper, etc.

In contrast to other letter-press processes which require paste inks, the flexographic process requires inks of great fluidity. Originally these inks were simply alcohol solutions of a dyestuff and a resin such as shellac, and hence were known as "spirit" or "aniline" inks. Dye-containing inks have by now been largely replaced by pigmented inks because of the better light-fastness properties of the latter.

While flexographic inks may be prepared employing a wide variety of solvents or dispersant fluids, including even water, hydrocarbons, esters, and ketones, the most important and widely used inks of this class are those containing primarily alcohol-type solvents such as methyl alcohol, ethyl alcohol, denatured alcohol, isopropyl alcohol, ethylene glycol monomethyl ether, ethylene glycol monoethyl ether, etc. Often small amounts of compatible non-alcohol solvents are also employed, such as acetone, methyl ethyl ketone, methyl-isobutyl ketone, dioxane, ethyl acetate, isopropyl acetate, etc., since these may aid in dissolving or dispersing the binder resin. The proportion of alcohol employed in the ink is generally between about 30% and about 75%, and the alcohol usually employed is ethyl alcohol.

Suitable resins include shellac, nitrocellulose, cellulose acetate, cellulose acetate-propionate, cellulose propionate, cellulose acetate-butyrate, cellulose butyrate, ethyl cellulose, various alkyd resins, modified rosins, etc. Shellac and nitrocellulose are preferred resins for these inks.

While, as above stated, a wide variety of resins may be employed in flexographic inks, nitrocellulose is one of the most widely used. Because of its low cost and unique combination of valuable properties, it constitutes at least part of the resin content of any of these inks. Nitrocellulose has unusually good pigment-wetting properties, and its films are hard, tough, adherent, and heat-resisting.

Any of a wide variety of dyes may be used, including methyl violet, eosin, erythrosin, rhodamine, etc. Suitable pigments include Lithol Red, Watchung Red, titanium dioxide, carbon black, Iron Blue, various lakes, etc.

In preparing and using these inks, it is important that the solvents be substantially anhydrous, since the presence of even small amounts of water greatly reduces their solvent power with respect to the resins employed, especially nitrocellulose. This presents no serious problem in the manufacture of these inks, since substantially anhydrous solvents are readily available and inexpensive. A water content of up to about 4 or 5% is usually unobjectionable; since the commercially available resins themselves often have a certain water content, and since exposure to the atmosphere incidental to handling and formulating the solvents and inks results in a certain amount of water pick-up, a water content of about 1-3% is normal in alcohol-type inks.

However, the inks are quite hygroscopic, and in use tend to become even more diluted with water abstracted from the atmosphere. This is especially pronounced when a flexographic press is operated in a very humid atmosphere such as is often encountered in the summer months. A large ink surface is exposed to the atmosphere in the ink-fountain and on the rollers, and moisture pick-up becomes a serious problem. Under some conditions, evaporation of solvent cools the ink to below the dew-point, and actual condensation of water occurs on the rollers and in and about the ink fountain. The resultant increase in the water content of the ink, especially when combined with the loss of solvent due to evaporation, often results in a thickening of the ink or in actual precipitation of resin. This phenomenon is designated "souring" in the trade, and in the case of typical alcohol-nitrocellulose inks, usually indicates a water content of at least 10–15%.

Even a moderate thickening of the ink interferes with the smooth operation of the high-speed presses customarily used in flexographic printing, resulting in ragged, irregular prints; in severe cases, especially when precipitation has occurred, printing becomes impossible. It has then been necessary to discard the ink in the press and replace it will fresh ink. This involves not merely a loss of material, but also a loss of printing time while the press is being cleaned and resupplied with fresh ink.

It is an object of this invention to provide a means of preventing or delaying this objectionable souring of flexographic inks. It is another object of this invention to provide a means of preventing an increase in the water content of such inks when exposed to humid atmospheres under conditions favoring water pick-up. Other objects will become apparent from the description of the invention which follows.

We have found that souring of flexographic inks is delayed and as a practical matter, prevented, by incorporating a volatile hydrolyzable ketal which forms volatile hydrolysis products as a solvent and water-content controller in the ink. The ketals suitable for use in this invention have the formula

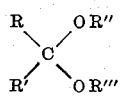

in which R and R' are alkyl groups having 1 to 4 carbon atoms and R" and R'" are from the class of alkyl and alkoxyalkyl groups having from 1 to 4 carbon atoms and in which the total number of carbon atoms in the said ketal is no more than about eight. Ketals suitable for use in the process of this invention include 2,2-dimethoxy-propane, 2,2-di-ethoxypropane, 2,2-dimethoxybutane, 2,2-diethoxybutane, 2,2-dimethoxypentane, 3,3-dimethoxypentane, 2,2-dimethoxy-3-methylbutane, etc.

Preferred ketals for use in this invention are 2,2-dimethoxypropane and 2,2-diethoxypropane.

The ketals suitable for use in this invention have the property of hydrolyzing very readily, especially in the presence of a trace of acid, to yield a mol of ketone and two mols of alcohol for each mol of ketal hydrolyzed. Hydrolysis of a mol of ketal consumes a mol of water. Unbuffered nitrocellulose solutions, even in the presence of only trace amounts of water, appear to undergo an extremely slow hydrolysis so as to keep them at a pH of about 5. Since the ketones and alcohols produced by ketal hydrolysis are excellent resin solvents, it is obvious that the presence of unhydrolyzed ketal in a flexographic ink containing nitrocellulose will prevent "souring" by reacting with moisture and converting to stable and volatile resin solvents.

With this explanation of the mode of action of the ketals in flexographic inks, it becomes possible to set up standards or guides to the selection of a suitable ketal for use in inks according to this invention.

(1) The ketal should have a volatility or boiling point such that it will volatilize unchanged with the other solvent or solvents employed.

(2) The hydrolysis products of the ketal should have volatility such that they will evaporate with the solvent or solvents employed.

2,2-dimethoxypropane boils at 83° C. 2,2-diethoxypropane boils at 114° C. These compounds both have volatility in the range of the preferred flexographic ink solvents and are well suited for use in this invention.

With inks based primarily on methyl or ethyl alcohols as solvents, the ketals derived from acetone or methyl ethyl ketone and methyl or ethyl alcohols are suitable. With inks based on less volatile solvents, the higher molecular weight ketals may be employed. However, since the main function of the ketal is to remove a molecularly equivalent amount of water from the solvent system, it is obvious that, weight for weight, the 2,2-dimethoxypropane is the most efficient of all, and is consequently preferred in most cases. This ketal has a pleasant, mild, camphor-like odor.

The amount of ketal employed in this invention is not critical. One can employ a ketal as the sole solvent in a flexographic ink; this results in an ink of great stability against "souring," but will ordinarily be impractically expensive. Generally, however, it is satisfactory and preferred to employ less than about 10% of ketal in the ink. We usually employ from about 3 to 7%, although even lesser amounts may be used to advantage.

In addition to using one of the ketals as above defined to prevent or delay "souring" by including it in the original ink formulation, it may be used to correct and restore an ink which has "soured" on the press. For this purpose, one merely adds small increments of ketal to the well-stirred or circulating ink until the "soured" ink becomes smooth and homogeneous again. Having attained this result, it is well to add an additional amount of ketal to give additional stability to the ink.

The following examples will serve to illustrate the practice of this invention. All parts are parts by weight.

*Example I*

Two solvent mixtures are prepared as follows:

| | A, parts | B, parts |
|---|---|---|
| Commercial anhydrous ethyl alcohol | 70 | 80 |
| Isopropyl acetate | 10 | 10 |
| Water | 10 | 10 |
| 2,2-Dimethoxypropane | 10 | |

Nitrocellulose dissolves readily and rapidly in solvent A to give a 20% solution, while it is essentially insoluble in solvent B.

*Example II*

Two solvent mixtures are prepared as follows:

| | I, parts | II, parts |
|---|---|---|
| Solution of 21.7 parts of nitrocellulose in 14 parts of isopropyl acetate and 64.3 parts anhydrous ethyl alcohol | 42.8 | 42.8 |
| Anhydrous ethyl alcohol | 16.4 | 16.4 |
| Isopropyl acetate | 2.1 | 2.1 |
| Ethyl Acetate | 7.1 | 11.4 |
| 2,2-Dimethoxypropane | 4.3 | |
| Water | 3.0 | 3.0 |
| Solution of 60 parts of hard resin (rosin-modified alkyd) in 40 parts of anhydrous ethyl alcohol | 24.3 | 24.3 |

These varnishes are then immediately tested for water content by the Karl Fischer method. Varnish I contains 3.65% water, and Varnish II contains 4.45% water. Since 4.3 parts of 2,2-dimethoxypropane will theoretically react with 0.745 part of water, this shows, within the limits of experimental error, that the reaction of 2,2-dimethoxypropane with water in an alcoholic nitrocellulose varnish is rapid and complete.

*Example III*

Souring of the varnish designated as II in Example II is simulated by further addition of about 9 parts of water to 90 parts of the varnish. The resulting soured or gelled varnish is now divided into two portions. To one portion, 10 parts of commercial anhydrous ethyl alcohol are added. This varnish still contains a large amount of gelled resin and is unusable. To the other portion, 10 parts of 2,2-dimethoxypropane are added. The gelled (sour) varnish clears immediately and is entirely acceptable for use as an ink varnish.

*Example IV*

A blue flexographic ink is made having the following composition:

| | Percent |
|---|---|
| Nitrocellulose | 7.4 |
| Ethyl alcohol | 42.9 |
| Isopropyl acetate | 13.0 |
| Ethyl acetate | 9.1 |
| Water | 2.4 |
| Hard resin (rosin-modified alkyd) | 11.7 |
| Victoria Blue lake | 10.0 |
| Watchung Red | 2.0 |
| Iron Blue | 1.5 |

This ink is then used for printing on cellophane in a commercial printing opertion during humid summer weather. After operation of the press for a few hours, "souring" occur so that the ink in the ink fountain and in the ink reservoir associated therewith is no longer usable and the press has to be stopped. Four percent of 2,2-dimethoxypropane (based on the total weight of ink in the fountain and reservoir) is added, and causes the ink to clear and become homogeneous again. The adhesion, printing qualities, and gloss of the ink improve immediately. Several rolls of cellophane are thereafter printed without any trouble of any sort, even though the atmosphere in the press-room continues very humid.

What is claimed is:

1. A printing ink consisting essentially of a colored solution of a resin in a volatile solvent comprising 2,2-dimethoxypropane.

2. An ink according to claim 1 which comprises about 30 to 75 parts by weight of ethyl alcohol and about 1 to 10 parts by weight of 2,2-dimethoxypropane.

3. The method of reducing the water content of a printing ink which comprises adding thereto a hydrolyzable ketal having a maximum of 8 carbon atoms and the following formula

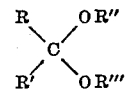

in which R and R' are alkyl groups having from one to four carbon atoms and R" and R''' are members selected from the group consisting of alkyl groups having from 1 to 4 carbon atoms and alkoxyalkyl groups having from 1 to 4 carbon atoms.

4. The method of restoring the fluidity of a soured flexographic ink which comprises adding thereto a minor proportion of 2,2-dimethoxypropane.

5. A method of preventing precipitation of resin from its solution in water soluble solvents due to pick-up of atmospheric moisture, which comprises adding to said solution an effective proportion of a hydrolyzable ketal

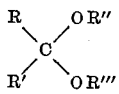

in which R and R' are alkyl groups having from 1 to 4 carbon atoms and R'' and R''' are members selected from the group consisting of alkyl groups having from 1 to 4 carbon atoms and alkoxyalkyl groups having from 1 to 4 carbon atoms.

References Cited in the file of this patent

UNITED STATES PATENTS

| | | |
|---|---|---|
| 2,229,665 | Mochel | Jan. 28, 1941 |
| 2,437,908 | Chiappe | Mar. 16, 1948 |
| 2,720,461 | Borger | Oct. 11, 1955 |
| 2,733,155 | Williams et al. | Jan. 31, 1956 |
| 2,736,741 | Schmidle | Feb. 28, 1956 |
| 2,827,494 | Brown et al. | Mar. 18, 1958 |

FOREIGN PATENTS

| | | |
|---|---|---|
| 558,539 | Canada | Jan. 10, 1958 |